US012584182B2

(12) United States Patent
Krull et al.

(10) Patent No.: US 12,584,182 B2
(45) Date of Patent: Mar. 24, 2026

(54) METHOD OF OPERATING AN ELECTRIC ARC FURNACE AND STEEL MILL

(71) Applicant: PAUL WURTH S.A., Luxembourg (LU)

(72) Inventors: Jan Krull, Varazze (IT); Katia Papalia, Genoa (IT)

(73) Assignee: PAUL WURTH S.A., Luxembourg (LU)

( * ) Notice: Subject to any disclaimer, the term of this patent is extended or adjusted under 35 U.S.C. 154(b) by 384 days.

(21) Appl. No.: 18/286,667

(22) PCT Filed: Apr. 20, 2022

(86) PCT No.: PCT/EP2022/060404
§ 371 (c)(1),
(2) Date: Oct. 12, 2023

(87) PCT Pub. No.: WO2022/223606
PCT Pub. Date: Oct. 27, 2022

(65) Prior Publication Data

US 2024/0191314 A1 Jun. 13, 2024

(30) Foreign Application Priority Data

Apr. 20, 2021 (LU) ........................................ 500065

(51) Int. Cl.
*C21B 13/12* (2006.01)
*C21B 13/00* (2006.01)
(Continued)

(52) U.S. Cl.
CPC .......... *C21B 13/12* (2013.01); *C21B 13/0006* (2013.01); *C21B 13/0073* (2013.01);
(Continued)

(58) Field of Classification Search
None
See application file for complete search history.

(56) References Cited

U.S. PATENT DOCUMENTS 6,478,841 B1 * 11/2002 Faccone .................. C21B 13/14 75/10.63
8,057,734 B2 * 11/2011 Drnevich ................ F27D 17/20 266/155

FOREIGN PATENT DOCUMENTS

EP 0997693 A2 5/2000
EP 2574683 A1 * 4/2013 ........... F27D 17/302
(Continued)

OTHER PUBLICATIONS

International Preliminary Report on Patentability for corresponding application PCT/EP2022060404 filed Apr. 20, 2022; Mail date Mar. 24, 2023.
(Continued)

*Primary Examiner* — Seth Dumbris
(74) *Attorney, Agent, or Firm* — CANTOR COLBURN LLP

(57) ABSTRACT

The disclosure discloses a method of operating an electric arc furnace, the method comprising capturing, from at least one facility of a steel mill, a heated metallurgical gas comprising water and carbon monoxide; conducting, by a reactor supply line, said metallurgical gas to a reactor; transforming, by a treatment of said metallurgical gas within said reactor, the carbon monoxide and water into hydrogen and carbon dioxide according to a water-gas shift reaction; and subsequently separating said hydrogen by a separation device. The method is characterized in that it further comprises providing an iron-bearing material, which comprises iron mainly in the form of iron oxide, to the electric arc furnace; at least partially melting the iron-bearing material to obtain a molten bath; conducting, by a furnace supply
(Continued)

line, said hydrogen to the electric arc furnace, which is arranged downstream of the furnace supply line; and injecting, by a plurality of hydrogen injection devices, said hydrogen into said electric arc furnace, such that said hydrogen reacts as a reducing agent for reducing iron oxide in the molten bath during a smelting operation of the electric arc furnace.

12 Claims, 1 Drawing Sheet

(51) Int. Cl.
*F27B 3/22* (2006.01)
*F27D 17/30* (2025.01)

(52) U.S. Cl.
CPC .............. *F27B 3/22* (2013.01); *F27D 17/304* (2025.01); *C21B 2100/80* (2017.05); *C21B 2300/02* (2013.01)

(56) References Cited

FOREIGN PATENT DOCUMENTS

| | | | |
|---|---|---|---|
| GB | 2553342 | A | 3/2018 |
| RU | 2326173 | C2 | 6/2008 |
| UA | 106053 | C2 | 7/2014 |
| WO | 9911826 | A1 | 3/1999 |
| WO | 2013045654 | A1 | 4/2013 |
| WO | 2013064870 | A1 | 5/2013 |

OTHER PUBLICATIONS

International Search Report for corresponding application PCT/EP2022060404 filed Apr. 20, 2022; Mail date Jul. 19, 2022.

Joachim von Scheele, "Hydrogen Steelmaking Solutions for Melting, Reheating, andGasification", https://www.researchgate.net/publication/349215137, Feb. 11, 2021.

Written Opinion for corresponding application PCT/EP2022060404 filed Apr. 20, 2022; Mail date Jul. 19, 2022.

Ukrainian Office Action; Application No. 202305354; date of mailing: Dec. 22, 2025; 11 pages.

* cited by examiner

METHOD OF OPERATING AN ELECTRIC ARC FURNACE AND STEEL MILL

TECHNICAL FIELD

The disclosure relates to a method of operating an electric arc furnace, an electric arc furnace and a steel mill.

BACKGROUND OF THE DISCLOSURE

Modern steel mills, respectively steel and metal production facilities, are under the constraint to reduce carbon dioxide emissions. For this reason, steelmakers replace fossil fuels used within the production facilities by so-called "green" electric energy or "renewable" fuels. In this context, hydrogen is used as a fuel and is thus considered a key factor in reducing $CO_2$ emissions. However, the production, transport and storage of large quantities of hydrogen represents a considerable technical challenge and is associated with high expenses. For this reason, the prior art often focuses on economic aspects of hydrogen production or on methods for substituting fossil fuels with hydrogen in production.

The main consolidated hydrogen production processes are steam reforming (of natural gas) and electrolysis. Steam reforming of natural gas is currently considered the most common and cheapest source of industrial hydrogen. Natural gas (methane) is heated up to 700-1100° C. in the presence of steam and a nickel catalyst. The methane molecules are cracked, such that carbon monoxide and hydrogen is formed. The carbon monoxide gas passes with steam over iron oxide or other oxides and due to the so-called water gas shift reaction additional hydrogen may be obtained. Hydrogen produced in this way is economically attractive, but still requires fossil fuels. In order to entirely avoid $CO_2$ emissions during hydrogen production, the $CO_2$ has to be captured and stored. In electrolysis, hydrogen is produced by units which are composed by several electric cells, each cell having an anode and a cathode submerged into an electrolytic solution and connected to a power source.

However, both methods, steam reforming and electrolysis, are quite expensive and require considerable amounts of energy as well as an extensive and safe infrastructure for the transport and storage of the hydrogen. If one of these methods is set to operation in an industrial environment, the corresponding production facility are usually completely separated from high-temperature areas, mostly out of safety reasons. This has the considerable disadvantage that valuable resources, as for example space and energy, may merely be used inefficiently in and on such premises.

In the prior art, there exist electric furnaces, such as electric arc furnaces (EAF), which are used to produce steel from a charging mix typically made by scrap and hot metal, wherein the EAF performs mainly a melting process. If iron oxides are contained in the charging mix, the EAF can also perform the reduction of these iron oxides.

Such a reduction can however only be performed in a limited amount, due to process constraints. Such an EAF usually requires a charging mix with a high metallization degree. For this reason, if iron oxides are included in the EAF input feed, they generally come from direct reduced iron (DRI) having a metallization degree higher than 88%, produced by a previous gas based direct reduction process. Such an EAF is called "direct heating type", since it generates a highly concentrated heat, released from the electric arc formed between the electrodes and the molten material.

Another type of electric furnaces, the so-called submerged arc furnaces (SAF), have been developed to reduce and melt metal oxides. These SAF are able to perform a complete reduction process starting from ores of metals such as Nickel, Chromium, Copper or Iron. In the SAF, the electrodes are submerged in the upper part of the melted material, respectively the slag or the molten bath, exploiting a heating principle based on the Joule effect from the electrical current developed by the electrodes inside a slag with high electrical resistance. Generally, the process parameters in the SAF are different from the above mentioned EAF. The SAF allows a complete reduction process from iron or other metal ores.

The reduction process in the EAF and the SAF is performed by carbon, generally in the form of coke or anthracite, as reducing agent, which can be injected through suitable lances or charged from a top charging system.

In cases where pre-reduced iron pellets, direct reduced iron (DRI) or hot briquetted iron (HBI) are included in the materials to be melted, some of the carbon required for the reduction process is already included in the DRI or HBI pellets. Thus, the reduction reaction in the EAF is carried out by both injected carbon and the carbon present in directly reduced iron.

The carbon not only acts as a reducing agent in the EAF as well as in the SAF, but is also needed to maintain the proper process conditions in terms of reactions kinetics, overall energy balance, heating transfer coefficient and process yields.

Such furnaces have thus the disadvantage that a relatively large quantities of carbon dioxide are released during their operation.

BRIEF SUMMARY OF THE DISCLOSURE

The disclosure provides a method for operating an electric arc furnace within a steel mill, wherein the quantities of emitted carbon dioxide are significantly reduced.

The present disclosure proposes a method of operating an electric arc furnace, the method comprising: capturing, from at least one facility of a steel mill, a heated metallurgical gas comprising water and carbon monoxide. The metallurgical gas is conducted to a reactor by a reactor supply line. The method comprises further transforming the carbon monoxide and the water comprised in said metallurgical gas into hydrogen and carbon dioxide according to a water-gas shift reaction by a treatment of said metallurgical gas within said reactor, and subsequently separating said hydrogen by a separation device. The method comprises further providing an iron-bearing material, which comprises iron mainly in the form of iron oxide, to the electric arc furnace; at least partially melting the iron-bearing material to obtain a molten bath; conducting said hydrogen through a furnace supply line to the electric arc furnace being arranged downstream of the furnace supply line; and injecting said hydrogen into the molten bath in said electric arc furnace by means of a plurality of hydrogen injection devices, such that said hydrogen acts as a reducing agent for reducing iron oxide in the molten bath during a smelting operation of the electric arc furnace.

The present method is based on the finding that hydrogen may be produced and used in a more sustainable and eco-friendly way in a steel mill and that it can advantageously be used as a reducing agent in an electric arc furnace operated as an electric smelter. It has been found that hydrogen ($H_2$) may be separated from a plurality of metallurgical gases emitted from different on-site installations, respectively facilities, of a steel mill. For example, hydrogen can be obtained/produced by steam injected in a CO-rich gas, such as Blast furnace gas, by exploiting the water gas shift reaction.

"Metallurgical gases" may generally refer to any gas emitted from a metallurgical facility, such as e.g. a (blast) furnace, stoves, coke batteries or similar facilities. Metallurgical gases form the basis for so called syngas, respectively synthetic gas, a fuel gas mixture comprising primarily hydrogen, carbon monoxide, and very often some carbon dioxide.

In particular, the present method aims to exploit the availability of syngas comprising hydrogen and/or carbon monoxide in a steel mill, wherein said carbon monoxide is used for a separation of hydrogen by steam. Syngas can be obtained from metallurgical gas according to known techniques, e.g. by performing a Boudouard reaction and/or water gas shift reaction. Alternatively, hydrogen may also be produced by other processes, such as for example natural gas reforming, biomass reforming, steam reforming. An example of a metallurgical gas may be blast furnace gas. Blast furnace gas comprises or consists of approximately 20 to 30 vol % $CO_2$, approximately 35 to 50 vol % $N_2$ and approximately 20 to 30 vol % CO, and $H_2$ around 5%. Another example of a metallurgical gas is the so called "converter gas". Converter gas comprises or consists of approximately 60 to 70% CO, approximately 10 to 20% $CO_2$, approximately 0-5% $H_2$, and approximately 5 to 15% $N_2$. Another example of a metallurgical gas is "coke oven gas". Coke oven gas comprises or consists of approximately 5 to 10% CO, approximately 50 to 55% $H_2$, approximately 20% $CH_4$ and/or other hydrocarbons, approximately 10% $N_2$ or less, as well as small amounts of $CO_2$. It should be noted that this composition as well as the exemplary percentages may change significantly according to process conditions. Metallurgical gases can be mixed with steam for heating and/or water addition.

The metallurgical gas may be treated by commonly known methods to separate hydrogen from other compounds. For example, the water gas shift (WGS) reaction and/or carbon dioxide removal methods may be used to turn carbon monoxide (CO), which forms part of said metallurgical gases, into carbon dioxide. The carbon dioxide is then separated easily (more easily then carbon monoxide) from the metallurgical gases, such that said remaining metallurgical gas comprises a high amount of hydrogen, respectively a particular high concentration of hydrogen.

It had been further found that recovering hydrogen gas by separating it from the gasses emitted by already present processes and facilities allows to provide, maintain and operate an electric arc furnace in a particularly economical and environmentally friendly fashion.

The present method is further based on the finding that said hydrogen may be directed into an electric arc furnace (EAF), wherein said hydrogen is injected into the molten bath, respectively the slag, thereby operating the electric arc furnace as an electric smelter. During such an operation of the EAF, said hydrogen is used as a reducing agent instead of carbon during the production of steel from iron-bearing materials mainly in the form of iron-oxide. As a result, the amount of carbon dioxide emitted from such an EAF as well as from the metallurgical installations may be significantly reduced. "Mainly" in this context means that more than 50% by weight, preferably at least 60% by weight, such as at least 70%, at least 80% or even more than 85% by weight of the iron-bearing material are in the form of iron oxide.

"Electric arc furnace" generally refers to an industrial furnace configured for smelting processes by means of (an) electric arc(s). The electric arcs within the electric arc furnace are generated between the electrodes or between the electrodes and the molten material, respectively the metal bath or slag) The electric arc furnace may be configured to be operated and to maintain the process conditions required for a reduction process using hydrogen. The process conditions may be characterized by parameters such as pressure, temperature, kinetics, heat transfer coefficient or similar parameters. An electric arc furnace may be powered by direct current or alternative current.

"Facility" generally refers to any industrial device or ensemble of apparatuses that are built, installed or established to serve a particular purpose. For example, a facility may comprise or consist of a blast furnace, a coke oven battery or a hot stove.

"Steel mill", respectively "steel plant", generally refers to an industrial facility where iron and steel and/or metals are manufactured.

"Reactor" generally refers to a device used as a vessel/vat/receptacle for a chemical reaction. A reactor may also comprise a plurality of vats which are separated from one another by e.g. a (semi-) permeable filter or a catalyst. For example, the reactor may be configured to transform the carbon monoxide and water comprised in the metallurgical gas into hydrogen and carbon dioxide.

"Furnace supply line" generally refers to a gas pipeline which conducts a gas, in particular hydrogen, into a furnace, as for example an electric arc furnace.

"Reducing agent" generally refers to a substance that reduces a chemical compound by donating electrons. According to prior art electric arc furnaces, the injection of coal allowed to reduce iron oxide in the slag. Further for example, carbon monoxide, which is also present in the melt, slag or bath within the EAF, may also act as a reducing agent on iron oxide. The reduction reaction within the EAF may be based on hydrogen as well as electric energy. Consequently, hydrogen may fully or at least partially replace carbon as a reducing agent, preferably to at least 25 mol.-%, advantageously to at least 50%, preferably to at least 60%, such as to at least 70%, to at least 80% or even to almost 100 mol.-%. In other words, the carbon currently used in state-of-art electric arc furnaces as reducing agent may be partially or completely replaced by hydrogen. Carbon dioxide emissions may be fully prevented or at least significantly reduced.

"Conducting" generally refers to the act of leading, transporting, transmitting a gas, usually by providing a conduct or channel in forms of e.g. a pipe, a tube, a line, a (gas) pipeline or a similar technical element. "Reactor supply line" generally refers to a gas pipeline which supplies a gas to a reactor.

"Capturing" generally refers to a process of separating, sequestering, storing, absorbing, catching, trapping and/or preventing an emission or release of a gas towards an external environment, such as, e.g. the atmosphere. For example, the metallurgical gases emitted from blast furnaces may be captured by suitable filters and/or separation apparatuses.

"Injecting" generally refers to an introduction of a gas into a facility, such as e.g. an EAF, or a melt or a mixture of compounds within the facility, such as e.g. a slag. The injection may be carried out with an injection device. "Injection device" generally refers to any device that is used to or configured for injecting a gas, such as e.g. hydrogen or oxygen, into a facility or a melt or a mixture of compounds within the facility. For example, the injection device may be submerged in the molten bath.

"Operating" generally refers to an action of functioning.

"Smelting" generally refers to the process of melting and reducing a metal-bearing material, e.g. a metal ore, such as an iron-bearing material which comprises iron mainly in the form of iron oxide, that leads to a chemical change or reaction within the molten state which results, for example, in the separation of a metal, such as metallic iron.

"Separating" generally refers to the act of isolating a gas component from a gas mixture. For example, after the metallurgical gas has been transformed in the reactor into hydrogen, carbon dioxide and potentially further byproducts, said hydrogen may be separated by said mixture by means of e.g. a filter or membranes. Additionally, the separation may also be carried out by known processes such as, e.g., gas separation methods based on cryogenic distillation, swing adsorption techniques, the Hampson-Linde cycle or similar separation methods. "Separation device" generally refers to an apparatus or a set of connected apparatuses that are used to or configured for operating a separating step or separating method.

"Transforming" generally refers to a change in composition, structure, form or appearance of a substance or a plurality of substances, as for example a gas mixture.

"Treating" or "treatment" generally refers to subjecting something to the action of an agent, a catalyst, an energy, a chemical, biological or physical influence or process. For example, a treatment may comprise guiding the metallurgical gas within the reactor to a heated catalyst.

In some embodiments, the metallurgical gas, after relevant gas cleaning, has a temperature in a temperature range of 20° C. to 100° C. It had been found that a metallurgical gas can be pre-heated in suitable heat recovery system, exploiting some available heat from other process within the integrated steelwork and may be transformed in subsequent reaction in a particularly energy efficient way. The metallurgical gases may be generally available at temperatures of 20° C. to 100° C., preferably at temperatures below 50° C. The metallurgical gases may be stored in a gas holder after gas cleaning, e.g. gas cleaning in a scrubber. Depending on their composition, it should be noted that these heated metallurgical gases may be subjected to known heat recovery methods.

The treatment for transforming carbon monoxide and water into hydrogen and carbon dioxide comprises at least a water-gas shift reaction, wherein said reaction is performed in presence of a catalyst. The "water-gas shift reaction", respectively water gas shift reaction or water gas conversion reaction, is a process for reducing/diminishing the carbon monoxide content in syngas and producing hydrogen. The reaction equation is also known as the conversion equilibrium: $CO+H_2O \leftrightarrow CO_2+H_2$.

In some embodiments, the method further comprises, subsequently to separating the hydrogen, conducting said hydrogen via a storage supply conduct to a hydrogen storage tank. "Storage supply conduct" generally refers to a pipeline used to or configured for leading said hydrogen into a hydrogen (storage) tank.

In some embodiments, the method further comprises discharging said hydrogen from said hydrogen storage tank via the furnace supply line to the electric arc furnace.

In some embodiments, the method further comprises heating said hydrogen upstream of the electric arc furnace, such that said hydrogen has a temperature in a range of 25 to 700° C. when said hydrogen is injected into said electric arc furnace. Heating said hydrogen leads to a pressure augmentation and, in consequence, enhances the distribution of the injected hydrogen in the molten bath. It should be noted that "heating" may also refer to a process of preheating the hydrogen gas before it is injected in the EAF.

In some embodiments, the plurality of hydrogen injection devices comprise at least one supersonic gas lance for injecting at least a part of said hydrogen supplied to the electric arc furnace into said furnace. In other words, the gas is injected at supersonic speeds.

In some embodiments, said hydrogen injected via the supersonic gas lance has a through put in the range of 10 $m^3$/min to 500 $m^3$/min.

In some embodiments, the method further comprises injecting oxygen into the electric arc furnace through a plurality of oxygen injection devices. The oxygen may be injected for oxidizing iron at least partially within the bath, respectively within the slag. In other words, the oxygen oxidizes at least a small amount of iron to wüstite (FeO) within the bath, exploiting the heat released from the exothermic reaction, which can be locally required to maintain the necessary process conditions.

In some embodiments, the method further comprises introducing lime into the electric arc furnace by a lime introduction device. "Lime introduction device" generally refers to any device that is used or configured for the introduction, respectively injection, of lime into the electric arc furnace or the slag layer within the electric arc furnace. Lime may for example comprise or consist of a quicklime. Lime may be used as a flux for cleaning the steel in the electric arc furnace (EAF). For example, lime may be used to remove sulfur, silica, phosphorus and similar substances.

In some embodiments, the method further comprises inserting/introducing a material in the electric arc furnace, wherein the material comprises at least one of the following: iron oxide, pre-reduced iron ore pellets, a direct reduced iron (DRI), hot briquette iron briquettes (HBI), blast furnace grade, DR grade iron ore pellets or fines or mixtures thereof. For example, a small amount of carbon which may be used for heating the melt may be provided by direct reduced irons in the form of cold pellets or hot briquettes. These reduced irons may be generated by natural gas based direct reduction process(es).

In some embodiments, the method further comprises supplying the electric arc furnace with an electric energy, wherein the electric energy is used to operate the EAF, and wherein the electric energy is obtained from a renewable energy source. "Renewable energy source" generally refers to a source that provides electric energy based on at least one of the following: solar energy, wind energy, hydroelectric energy, biomass energy, geothermal energy, tidal and wave energy, or mixtures thereof. Due to the use of renewable energy sources, the method allow a "green steel" production, mostly or completely $CO_2$ free, provided that only iron ore and/or DRI/HBI from Hydrogen based direct reduction process are charged in the EAF as iron bearing material.

The disclosure further relates to a steel mill comprising an electric arc furnace and being adapted to:

capture a heated metallurgical gas comprising water and carbon monoxide, from at least one facility of the steel mill;

conduct said metallurgical gas to a reactor through a reactor supply line;

transform the carbon monoxide and water into hydrogen and carbon dioxide according to a water-gas shift reaction, by a treatment of said metallurgical gas within said reactor, and subsequently separate said hydrogen by a separation device;

wherein the steel mill is adapted to:

provide an iron-bearing material, which comprises iron mainly in the form of iron oxide, to the electric arc furnace;

at least partially melt the iron-bearing material to obtain a molten bath;

conduct said hydrogen through a furnace supply line to the electric arc furnace arranged downstream of the furnace supply line; and inject said hydrogen into the molten bath in said electric arc furnace by means of a plurality of hydrogen injection devices such that said hydrogen acts as a reducing agent for reducing iron oxide in the molten bath during a smelting operation of the electric arc furnace. The aforementioned improvements and embodiments of the method according to the disclosure apply also to the steel mill.

Further aspects and features of the present disclosure derive from the dependent claims, the attached drawing and the following description of the embodiments.

BRIEF DESCRIPTION OF THE DRAWINGS

Embodiments of the disclosure are now described by way of example and with reference to the attached drawings, wherein.

DETAILED DESCRIPTION

Figure 1:
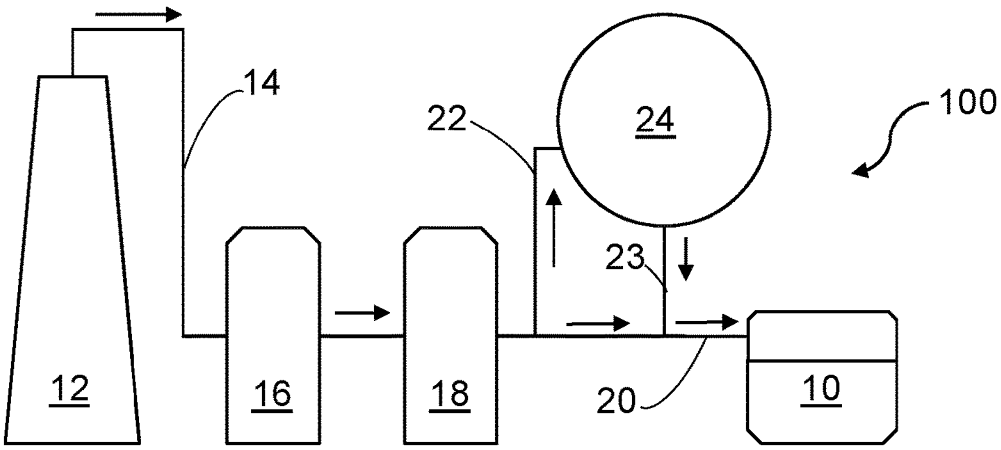
FIG. 1: is a schematic view illustrating the method, the electric arc furnace and the steel mill according to the disclosure.

FIG. 1 illustrates a schematic view of the method as well as the electric arc furnace and the steel mill 100 according to the disclosure. The steel mill 100 comprises a facility 12 consisting of a blast furnace 12 emitting heated metallurgical gases comprising water and carbon monoxide. The gas from blast furnace has a temperature in a range of approximately 200° ° C. to 300° C. The metallurgical gas may be cleaned by a scrubber and stored in a gas holder (not shown). As shown on FIG. 1, the metallurgical gases emitted by the blast furnace 12 are captured and guided by/through the reactor supply line 14 to the reactor 16. The metallurgical gas has to be pre-heated for the hydrogen production process, for instance by mixing the metallurgical gas with steam (not shown), wherein the steam provides the heat and the water necessary for the water gas shift reaction.

Further devices (not shown), such as a temperature sensor, a pressure sensor, a flow meter and (automatic) valves may be arranged on and/or or within the reactor supply line 14. These further devices may be connected to a control unit, such as for example a computer (not shown). The control unit may be configured to determine process parameters related to the metallurgical gas, such as for example the temperature of the metallurgical gas, the pressure of the metallurgical gas and/or the velocity of the metallurgical gas. Depending on these process parameters, the control unit may determine by means of a software whether a valve arranged within the reactor supply line 14 should be fully opened, partially opened or closed.

The metallurgical gas conducted through said reactor supply line 14 is introduced in the reactor 16, wherein the carbon monoxide and water compounds in the metallurgical gas are transformed into carbon dioxide and hydrogen. The transforming of carbon monoxide and water into hydrogen and carbon dioxide is based on a water-gas shift reaction in presence of a catalyst, such as e.g. a nickel-based catalyst (not shown). Before the metallurgical gas is treated in the reactor, further steps may be carried out upstream of the reactor in order to heat the gas and/or to separate substances, such as e.g. gaseous sulphur compounds, from the metallurgical gas that would otherwise harm the catalyst (not shown).

After the gas has been treated in the reactor, the gas is conducted to the separation device 18 wherein said hydrogen is separated from the other compounds of the metallurgical gas. In a subsequent step, said hydrogen is either led directly by a furnace supply line 20 to the electric arc furnace arranged downstream of said furnace supply line 20, or via a supply conduct 22 to a hydrogen storage tank 24. In order to operate the passage of said hydrogen towards the tank 24 and/or the electric arc furnace 10, (automatic) valves are arranged within the supply conduct 22 and the furnace supply line 20 (not shown). The valves comprise actuators that are operated by the computer. Additionally, both, the furnace supply line 20 and the supply conduct 22, comprise each a pressure sensor, a flow meter and a temperature sensor (not shown) connected to the computer. Said hydrogen is conducted depending on the requirements of the electric arc furnace 10 either directly into said furnace or into the storage tank 24. In case said hydrogen is stored in the tank 24, said hydrogen may be released at a predetermined rate and/or volume into the electric arc furnace. As can be further derived from FIG. 1, a discharge line 23 for discharging said hydrogen is in fluid communication to the furnace supply line 20. The discharge line 23 comprises a temperature sensor, a flow meter, a pressure sensor and an (automatic) valve, wherein each of these elements is connected to and operated by the control unit (not shown).

In addition, the furnace supply line 20 may comprise an optional heating arrangement (not shown), wherein the heating arrangement is likewise controlled by the computer. The heating arrangement allows to heat up said hydrogen upstream of the electric arc furnace, such that said it has a temperature in a range of 25° C. to 700° C. when it is injected into said electric arc furnace.

Figure 2:
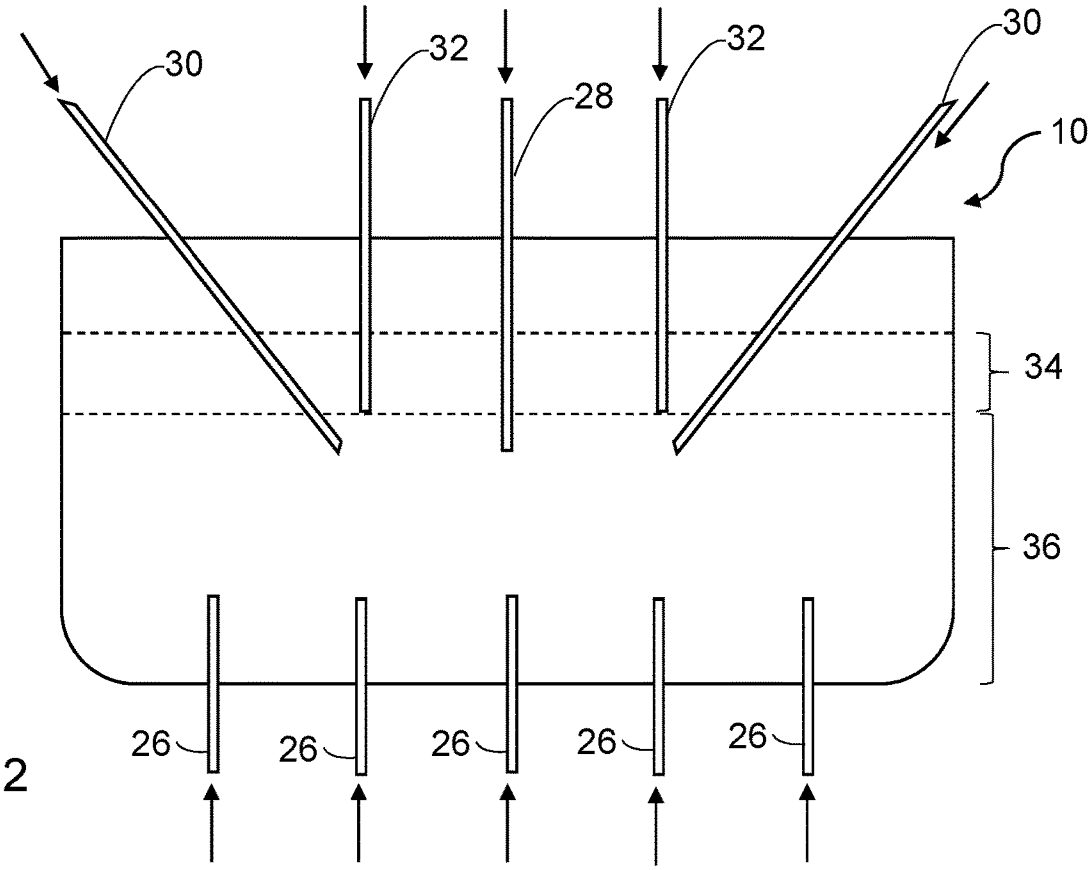
FIG. 2: is a schematic view illustrating the electric arc furnace according to the disclosure.

Said hydrogen is injected into the electric arc furnace 10 through/by a plurality of injection devices 26, as is shown in more detail in FIG. 2. The two dashed horizontal lines inside the furnace symbolize the boundaries between a slag area 34 and a liquid metal area 36. During the operation of the electric arc furnace, a slag layer 34 forms at the surface in proximity to the electrode(s) (not shown). Beneath the slag layer 34, a liquid metal layer 36 is generated after the electric arc furnace 10 is operated for a certain time. The electrode(s) of the EAF are protruding from an upper section, respectively from a furnace hat (not shown), into the slag. In other words, the electrodes are at least partially submerged in the slag.

The plurality of hydrogen injection devices 26 comprise also a supersonic gas lance 28, which protrudes from an upper section of the furnace, respectively the furnace cover, into the liquid metal area 36. During the operation of the EAF, hydrogen is injected via the supersonic gas lance 28 in a rate which is preferably in the range of 10 $m^3$/min to 500 $m^3$/min.

In addition, the electric arc furnace 10 is also provided with a plurality of oxygen injection devices 30, respectively lances, for injecting oxygen into the electric arc furnace 10. The oxygen injection devices 30 are spaced apart from said hydrogen injection devices 26 and the supersonic gas lance 28. It should be noted that also the oxygen injection devices 26 may comprise or consist of a supersonic gas lance.

As further shown in FIG. 2, a lime introduction device 32 is protruding into the liquid metal area 32 of the electric arc furnace respectively at the interface between the liquid metal area 32 and the slag area 34. The lime introduction device 32 provides a jet of lime during the operation of the electric arc furnace.

During the operation of the electric arc furnace, material is inserted in the hearth of the furnace. The material may comprise at least one of the following: scrap iron, iron oxide, pre-reduced iron ore pellets, a direct reduced iron (DRI), hot briquette iron briquettes (HBI), blast furnace grade, DR grade iron ore pellets or fines or mixtures thereof. The electric arc furnace is powered by electric energy, wherein said electric energy is obtained from a renewable energy source.

The injected hydrogen is used to reduce iron oxides (for example FeO) into iron (Fe) and water according to the following reaction equation:

$$FeO+H_2\leftrightarrow Fe+H_2O.$$

In addition, the injected hydrogen is further used to react with oxygen whilst releasing heat according to the following equation:

$$H_2+\tfrac{1}{2}O_2\rightarrow H_2O.$$

The injected oxygen is used to oxidize iron (Fe) according to the following equation:

$$Fe+\tfrac{1}{2}O_2\rightarrow FeO.$$

As can be understood from FIG. 2, the amount of carbon dioxide is totally or at least significantly reduced during the operation of the electric arc furnace 10.

The discussed embodiments are examples of the disclosure. The described components of each respective embodiment represent each individual features of the disclosure which are to be considered independently of each other. The features are thus also to be regarded as components of the disclosure individually or in a combination other than the combination shown. Furthermore, the described embodiments may also be supplemented by further features of the disclosure already described.

Further features and embodiments of the disclosure result for the skilled person in the context of the present disclosure and the claims.

The invention claimed is:

1. A method of operating an electric arc furnace, the method comprising:
  - capturing a heated metallurgical gas comprising water and carbon monoxide, from at least one facility of a steel mill;
  - conducting said metallurgical gas to a reactor through a reactor supply line;
  - transforming the carbon monoxide and water into hydrogen and carbon dioxide according to a water-gas shift reaction, by a treatment of said metallurgical gas within said reactor, and subsequently separating said hydrogen by a separation device;
  - providing an iron-bearing material, which comprises iron mainly in the form of iron oxide, to the electric arc furnace;
  - at least partially melting the iron-bearing material to obtain a molten bath;
  - conducting said hydrogen through a furnace supply line to the electric arc furnace, which is arranged downstream of the furnace supply line; and
  - injecting said hydrogen into the molten bath in said electric arc furnace by means of a plurality of hydrogen injection devices such that said hydrogen acts as a reducing agent for reducing iron oxide in the molten bath during a smelting operation of the electric arc furnace.

2. The method according to claim 1, wherein the heated metallurgical gas has a temperature in a temperature range of 20° C. to 100° C.

3. The method according to claim 1, wherein the water-gas shift reaction is performed in presence of a catalyst.

4. The method according to claim 1, wherein the method further comprises conducting said hydrogen via a storage supply conduct to a hydrogen storage tank and discharging said hydrogen from said hydrogen storage tank via the furnace supply line to the electric arc furnace.

5. The method according to claim 1, wherein the method further comprises heating said hydrogen upstream of the electric arc furnace, such that said hydrogen has a temperature in a range of 25° C. to 700° C. when said hydrogen is injected into said electric arc furnace.

6. The method according to claim 1, wherein the plurality hydrogen injection devices comprises at least one supersonic gas lance for injecting at least a part of said hydrogen supplied to the electric arc furnace into said furnace.

7. The method according to claim 6, wherein hydrogen injected via the supersonic gas lance has a throughput in the range of 10 $m^3$/min to 500 $m^3$/min.

8. The method according to claim 1, wherein the method further comprises injecting oxygen into the electric arc furnace through a plurality of oxygen injection devices.

9. The method according to claim 1, wherein the method further comprises introducing lime into the electric arc furnace by a lime introduction device.

10. The method according to claim 1, wherein the method further comprises inserting a material in the electric arc furnace, wherein the material comprises at least one of the following: iron oxide, pre-reduced iron ore pellets, a direct reduced iron, hot briquette iron briquettes, blast furnace grade, DR grade iron ore pellets or fines or mixtures thereof.

11. The method according to claim 1, wherein the method further comprises operating said electric arc furnace with electric energy obtained from a renewable energy source.

12. A steel mill comprising an electric arc furnace and being adapted to:
  - capture a heated metallurgical gas comprising water and carbon monoxide, from at least one facility of the steel mill;
  - conduct said metallurgical gas to a reactor through a reactor supply line;
  - transform the carbon monoxide and water into hydrogen and carbon dioxide according to a water-gas shift reaction, by a treatment of said metallurgical gas within said reactor, and subsequently
  - separate said hydrogen by a separation device;
  - provide an iron-bearing material, which comprises iron mainly in the form of iron oxide, to the electric arc furnace;
  - at least partially melt the iron-bearing material to obtain a molten bath;
  - conduct said hydrogen through a furnace supply line to the electric arc furnace arranged downstream of the furnace supply line; and
  - inject said hydrogen into the molten bath in said electric arc furnace by means of a plurality of hydrogen injection devices such that said hydrogen acts as a reducing agent for reducing iron oxide in the molten bath during a smelting operation of the electric arc furnace.

* * * * *